US012090098B2

(12) United States Patent
Donahue

(10) Patent No.: US 12,090,098 B2
(45) Date of Patent: Sep. 17, 2024

(54) WHEELCHAIR TOWING COUPLER

(71) Applicant: All In Design & Build Inc., San Jose, CA (US)

(72) Inventor: Sean Donahue, San Jose, CA (US)

( * ) Notice: Subject to any disclaimer, the term of this patent is extended or adjusted under 35 U.S.C. 154(b) by 159 days.

(21) Appl. No.: 17/502,585

(22) Filed: Oct. 15, 2021

(65) Prior Publication Data

US 2023/0122530 A1 Apr. 20, 2023

(51) Int. Cl.
*A61G 5/00* (2006.01)

(52) U.S. Cl.
CPC .................................... *A61G 5/003* (2013.01)

(58) Field of Classification Search
CPC ...................................................... A61G 5/003
USPC .......................................................... 280/507
See application file for complete search history.

(56) References Cited

U.S. PATENT DOCUMENTS 6,341,791 B1 * 1/2002 Cannon, Sr. ............. B62K 3/16
280/204

FOREIGN PATENT DOCUMENTS

DE 19514335 A1 * 10/1995 ............. B62K 27/12
WO 2014137028 A1 9/2014

* cited by examiner

*Primary Examiner* — Tony H Winner
*Assistant Examiner* — Felicia L. Brittman-Alabi
(74) *Attorney, Agent, or Firm* — Galvin Patent Law LLC; Brian R. Galvin

(57) ABSTRACT

A wheelchair towing coupler that connects a wheelchair for towing behind a bicycle or other vehicle by connecting the wheelchair to a structural member of the vehicle or to an existing towing hitch, that enables towing the wheelchair while occupied by a seated user and that also provides the wheelchair user with the ability to decouple from the vehicle to operate the wheelchair independently as needed.

4 Claims, 7 Drawing Sheets

WHEELCHAIR TOWING COUPLER

CROSS-REFERENCE TO RELATED APPLICATIONS

None.

BACKGROUND

Field of the Art

The disclosure relates to the field of assistive devices for individuals with disabilities, and more particularly to the field of connecting a wheelchair to a bicycle or other vehicle for towing.

Discussion of the State of the Art

Wheelchair users often experience reduced mobility and loss of previously-enjoyed activities such as cycling, and no good system exists for enabling a wheelchair user to participate in such activities. Additionally, many vehicles are unable to transport a wheelchair without extensive modification or replacement, such as small electric cars or motorcycles.

What is needed, is a wheelchair towing coupler that enables a wheelchair to be affixed behind a vehicle for towing, that can accommodate an occupant during towing, and that enables the wheelchair occupant to decouple from the tow vehicle at will and without assistance, to provide improved wheelchair transportation capability for vehicles without wheelchair accommodation, as well as to provide enhanced freedom, mobility, and agency for wheelchair users.

SUMMARY

Accordingly, the inventor has conceived and reduced to practice, a wheelchair towing coupler that connects a wheelchair for towing behind a bicycle or other vehicle by connecting the wheelchair to a structural member of the vehicle or to an existing towing hitch, that enables towing the wheelchair while occupied by a seated user and that also provides the wheelchair user with the ability to decouple from the vehicle to operate the wheelchair independently as needed.

According to one aspect, a wheelchair towing coupler, comprising: a rigid structural member constructed of a material that provides sufficient rigidity and strength to withstand stresses of towing a wheelchair behind a vehicle; a forward quick-disconnect coupler comprising: a first docking cradle configured to receive the rigid structural member and secure it within the first docking cradle while permitting rotation of the rigid structural member about an axis of motion; and a first quick-disconnect fastener configured to release the rigid structural member from the first docking cradle when manipulated by a user; a rear quick-disconnect coupler affixed to or formed as a component of the rigid structural member, comprising: a second docking cradle configured to receive a structural member of a wheelchair; and a second quick-disconnect fastener configured to release the structural member of the wheelchair from the second docking cradle when manipulated by a user, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
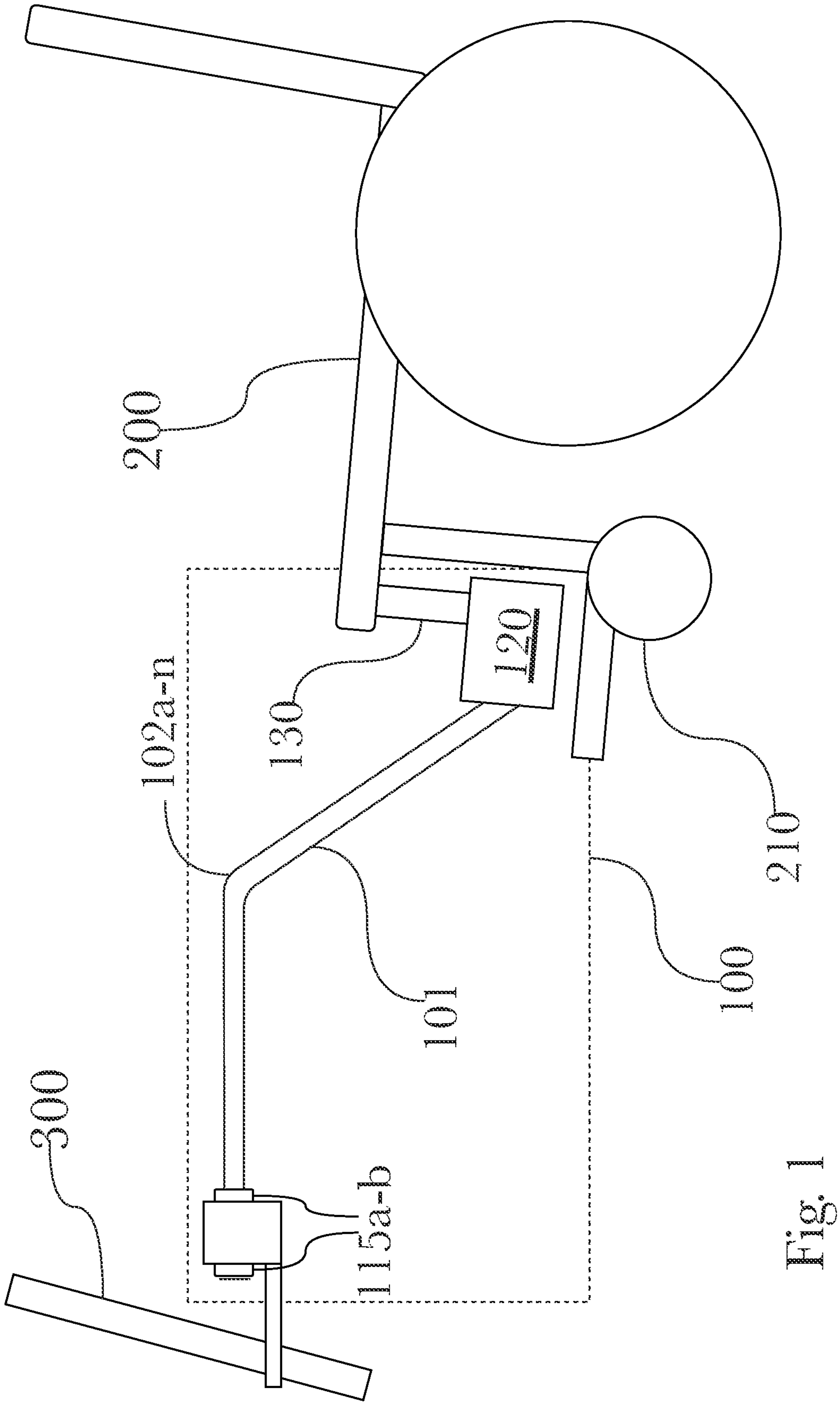
FIG. 1 is a diagram illustrating an exemplary wheelchair towing coupler in profile, according to one aspect.

The inventor has conceived, and reduced to practice, a wheelchair towing coupler that connects a wheelchair for towing behind a bicycle or other vehicle by connecting the wheelchair to a structural member of the vehicle or to an existing towing hitch, that enables towing the wheelchair while occupied by a seated user and that also provides the wheelchair user with the ability to decouple from the vehicle to operate the wheelchair independently as needed.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Detailed Description of Exemplary Aspects

FIG. 1 is a diagram illustrating an exemplary wheelchair towing coupler 100 in profile, according to one aspect. Wheelchair towing coupler 100 may be used to affix a wheelchair 200 to a tow vehicle 300 for towing behind the tow vehicle 300, optionally with an occupant seated in the wheelchair during towing. Tow vehicle 300 may be any of a number of vehicles that may be suitable for towing a wheelchair, ideally capable of smooth travel at low speeds. For example, tow vehicles may include (but are not limited to) bicycles, tricycles, motorcycles or scooters, club cars or golf carts, all-terrain vehicles, utility vehicles, electric bikes or cars, or any automobile that may be suited for the task of towing a wheelchair. Additionally, towing may occur with or without an occupant in the wheelchair, providing a means for transporting a wheelchair using a vehicle that may otherwise be unable to accommodate it (such as a small automobile that cannot fit a wheelchair in its interior space).

Wheelchair towing coupler 100 comprises a rigid structural member 101 that may be constructed of any material or combination of materials having suitable strength and rigidity to pull the weight of a wheelchair and occupant, flex and return to shape during a turn or when exposed to other lateral forces, and resist shear stresses during impacts or collisions. Rigid structural member 101 may further comprise a plurality of formed angles, bends, or joints 102*a-n* to accommodate differences in height or profile between wheelchair 200 and tow vehicle 300, for example to ensure that wheelchair 200 is kept at a suitable angle relative to the ground plane so as to accommodate an occupant. For example, when used normally a wheelchair may have a seat angle (relative to the ground plane) of 1°; when using a towing coupler 100, the front of the wheelchair may be raised (for example, to lift any forward casters or other stabilizing wheels off the ground for easier towing with less wear on wheelchair components), changing the seat angle to 10°. This ensures rider comfort and safety, while keeping the wheelchair stable during towing in order to accommodate complex terrain that may be encountered such as potholes, dirt roads, or speed bumps. To accomplish this, joints 102*a-n* may optionally be constructed with a degree of articulation such as via locking pivot joints that may be positioned and then locked into place (such as, for example, push-button sliding joints as are common in the art) so that the towing coupler 100 may be adjusted to accommodate different tow vehicle and wheelchair combinations while maintaining a desired positioning of wheelchair 200. Additionally, front wheels or casters 210 of the wheelchair 200 may be raised enough to allow for pivoting or retracting away from the ground for additional clearance to accommodate terrain. Front wheels or casters 210 may also be adjustable in height such as via a push-button locking mechanism in the structural portion of wheelchair 200 to which the front wheels or casters 210 are attached or formed. In this manner, both the angle and ground clearance of the wheelchair 200 and its features and components may be easily adjusted for rider comfort and towing safety. Additionally, joints 102*a-n* may be formed and positioned to accommodate a variety of accessories such as (for example, including but not limited to) water bottle holders, emergency kits, tire pumps, phone or computing device attachments, fitness sensors, GPS or navigation devices, or any other device that may be attached to rigid structural member 101 in a location and orientation suitable for use by a wheelchair occupant.

To facilitate towing a wheelchair behind a vehicle, towing coupler 100 further comprises a front coupler attachment 110 that affixes to a vehicle and a rear coupler attachment 120 that affixes to a wheelchair 200. Front coupler attachment 110 may comprise a tow hitch adapter such as for use with any of a number of standardized towing hitches on an automobile, or may comprise a quick-disconnect type coupler connector (described in greater detail below, with reference to FIG. 2) for use with vehicles that lack a standardized tow hitch, such as a bicycle or scooter. Rear coupling attachment 120 may comprise a similar quick-disconnect type coupler connection (described in greater detail below, with reference to FIG. 3) for affixing to a rigid frame of a wheelchair such as via a rigid bar 130 or an affixed or integrally-formed D-ring, carabiner, a rigid frame loop or segment, or any other structural portion of the wheelchair 200 that will provide a secure location to fasten the rear coupling attachment 120, enabling a seated occupant to secure or disconnect the towing connection at will while seated in the wheelchair without assistance.

Figure 2:
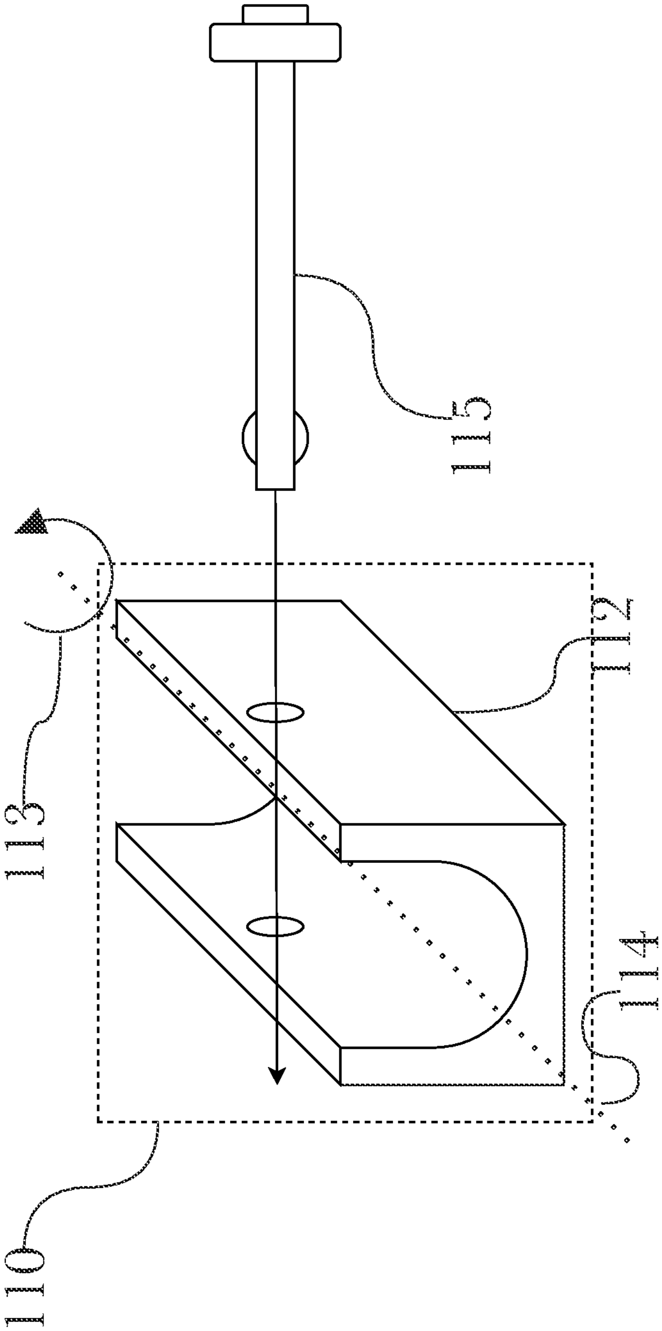
FIG. 2 is a diagram illustrating an exemplary detail view of a front quick-disconnect coupler attachment, according to one aspect.

FIG. 2 is a diagram illustrating an exemplary detail view of a front quick-disconnect coupler attachment 110, according to one aspect. As illustrated, front quick-disconnect coupler attachment 110 may comprise a pivotable or rotating cradle 112 for accommodating a rigid structural member 101 of towing coupler 100, such that when coupled the rigid structural member 101 can pivot or rotate 113 about an axis 114 of movement, facilitating articulation during towing in order to accommodate movement between the tow vehicle and the wheelchair, rough or uneven terrain, turns, impacts, or other forces. A quick-disconnect fastener 115 may then be used to secure rigid structural member 101 within cradle 112, for example a push-button or cotter pin. Rigid structural member 101 is retained within cradle 112 by the quick-disconnect fastener 115 which prevents removal from cradle 112, as well as a plurality of formed rigid stops 115*a-b* that prevent rigid structural member 101 from being pulled free along the axis 114 of cradle 112 while still permitting rotation or pivoting 113 of the rigid structural member 101 about the axis 114. Quick-disconnect coupler attachment 110 may be affixed to a structural member of a tow vehicle, for example a seat tube of a bicycle or a frame bar of an automobile, and may alternatively be constructed with a standard hitch mount to enable coupling via a standardized towing hitch on an automobile, ATV, UTV, club car, or other such vehicle.

Figure 3:
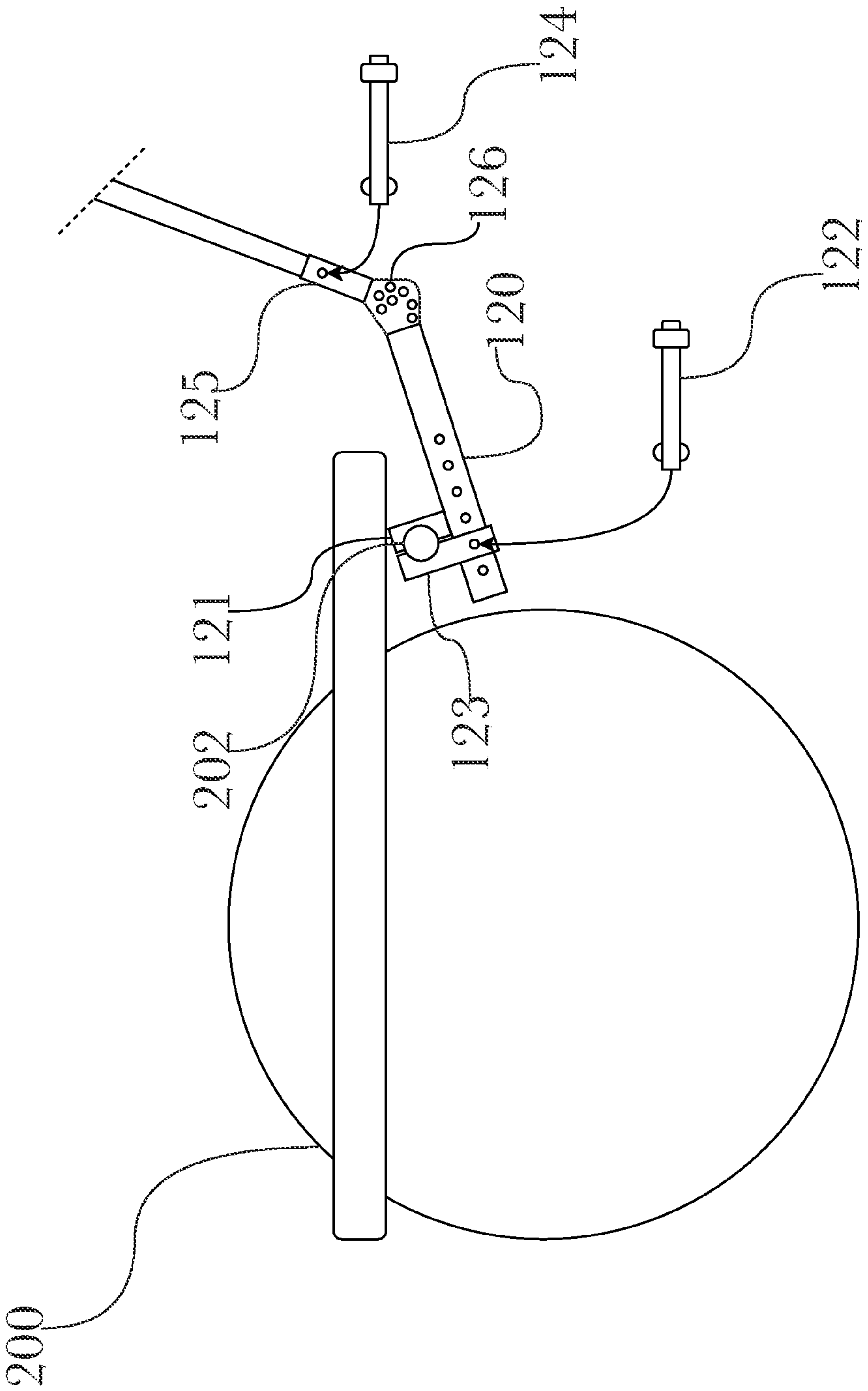
FIG. 3 is a diagram illustrating an exemplary detail view of a rear quick-disconnect coupler attachment, according to one aspect.

FIG. 3 is a diagram illustrating an exemplary detail view of a rear quick-disconnect coupler attachment 120, according to one aspect. As illustrated, a rear quick-disconnect coupler 120 may comprise a docking cradle 121 configured to accept structural members of a wheelchair 200, such as a cross-brace or seat support. As described above with reference to a front quick-disconnect coupler in FIG. 2, cradle 121 may permit a degree of movement of a coupled structural member to allow pivoting to accommodate movement during towing such as from uneven or rough terrain, turns, impacts, or other forces. Cradle 121 may further comprise a quick-disconnect fastener 122 such as a push-button or cotter pin. To accommodate wheelchairs that may vary in size and construction, cradle 121 may be constructed with a sliding adjustment 123 that a wheelchair occupant or an assistant may slide into position to actively retain wheelchair structural member 202, as well as an angle adjustment joint 126 that may utilize a variety of mechanical means such as (for example, including but not limited to) a push-button mechanism to adjust an angle of rear quick-disconnect coupler 120 to accommodate differences in height between a wheelchair 200 and tow vehicle 300, or to reach a desired seat angle or ground clearance. Sliding adjustment 123 may then be locked into position using a quick-disconnect fastener 122 to secure the adjustment and prevent wheelchair 200 from decoupling accidentally. A second quick-disconnect fastener 124 may be used to secure the coupled wheelchair to the tow vehicle via a locking sleeve 125 that connects the rear quick-disconnect coupler 120 to a main rigid structural member 101 of the towing coupler 100.

Figure 4:
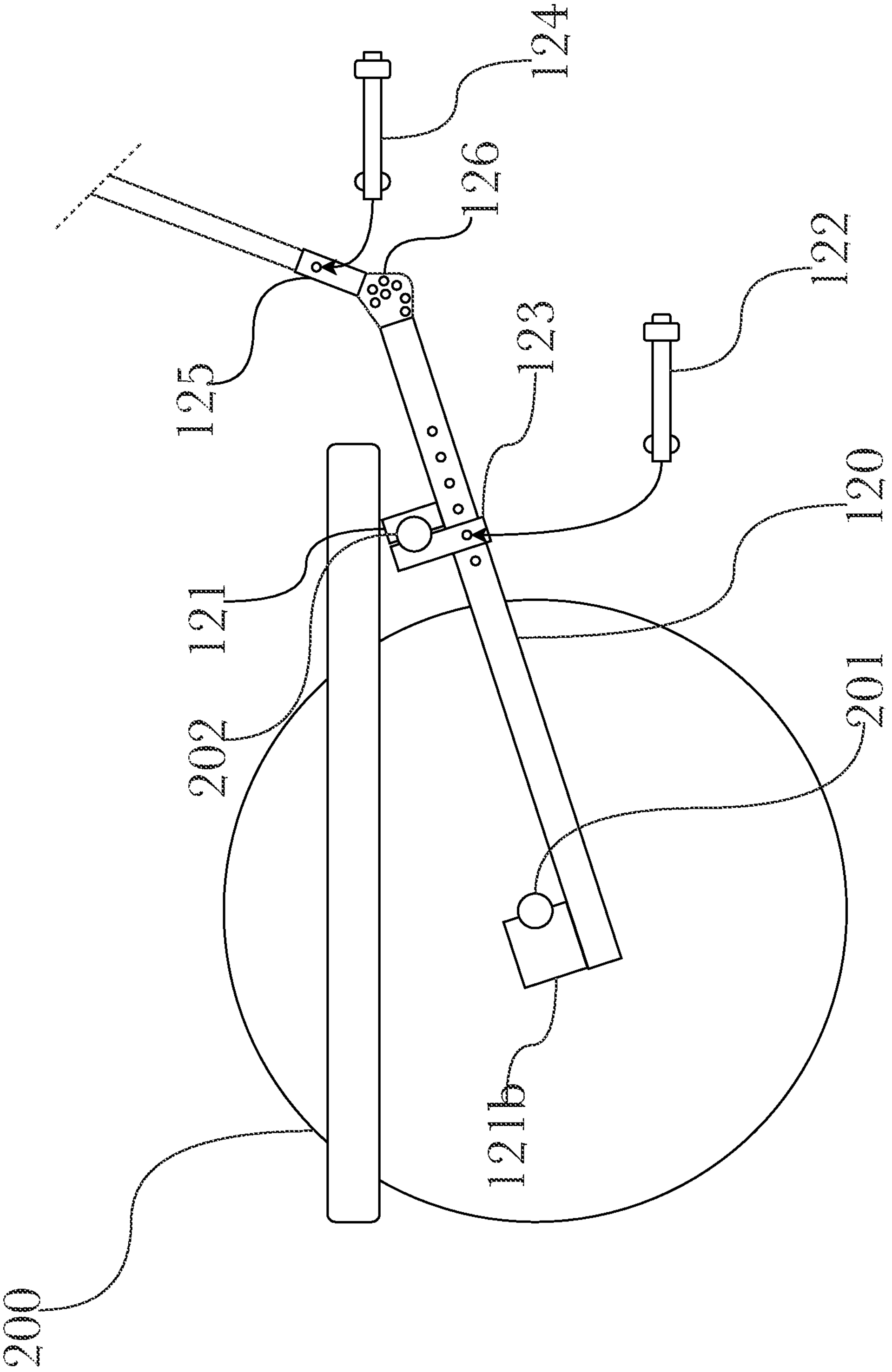
FIG. 4 is a diagram illustrating an exemplary detail view of a rear quick-disconnect coupler attachment, illustrating the use of a second docking cradle according to one aspect.

FIG. 4 is a diagram illustrating an exemplary detail view of a rear quick-disconnect coupler attachment, illustrating the use of a second docking cradle 121*b* according to one aspect. For additional stability or to accommodate wheelchairs of varying size or construction, a second cradle 121*b* may be utilized to retain a wheelchair 200 at a second point, such as a main wheel axle 201. Second cradle 121*b* may be constructed without the use of a fastener to passively retain a coupled wheelchair structural member, as is illustrated with reference to 121*b*, shown passively retaining a primary wheel axle 201 of wheelchair 200 while a forward cradle 121*a* actively retains a cross-member of the wheelchair 200 using a quick-disconnect fastener 122.

Figure 5:
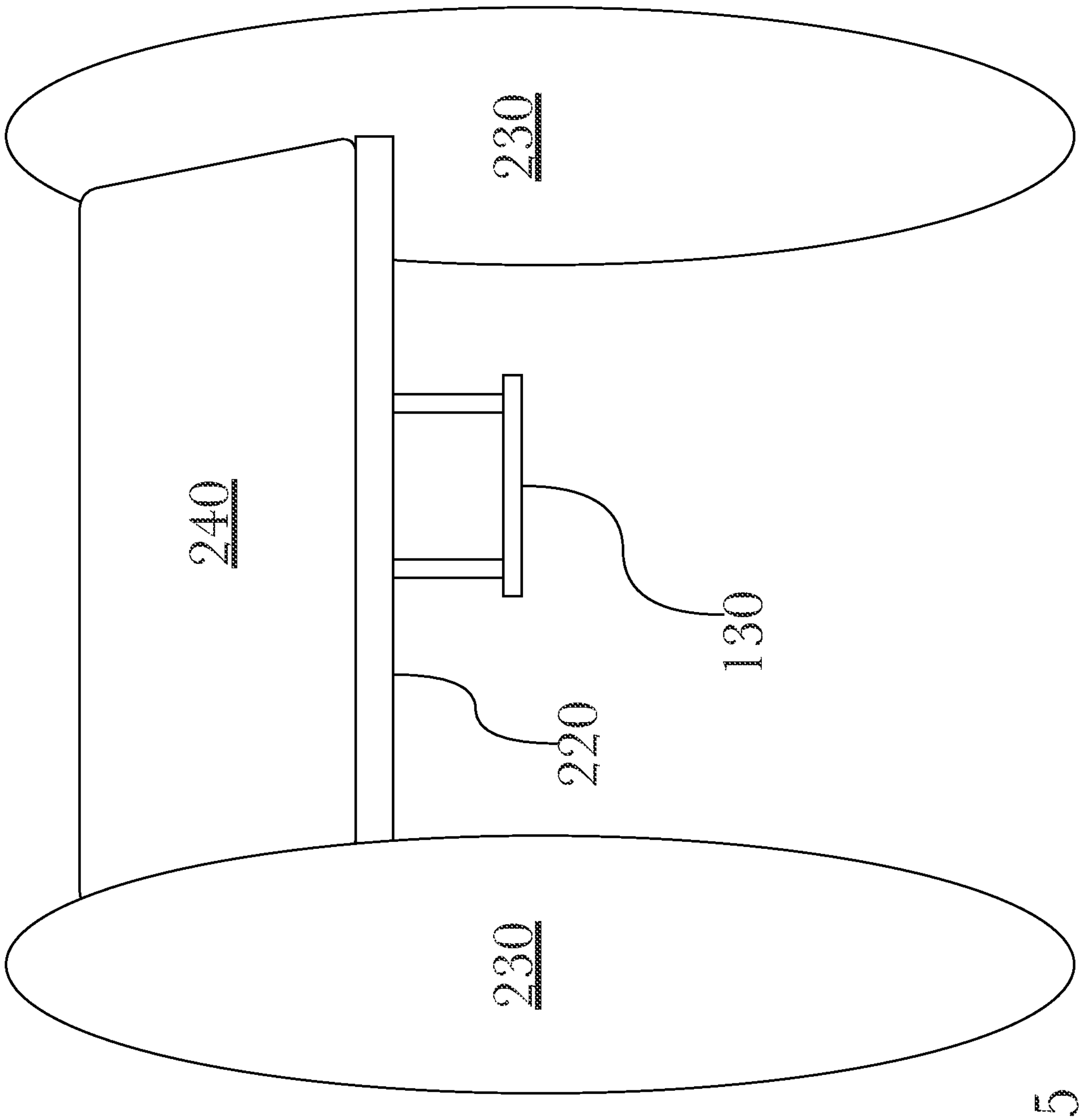
FIG. 5 is a diagram illustrating an exemplary wheelchair structural bar suitable for attaching a rear quick-disconnect coupler, according to one aspect.

FIG. 5 is a diagram illustrating an exemplary wheelchair structural bar 130 suitable for attaching a rear quick-disconnect coupler 120, according to one aspect. As illustrated, a wheelchair 200 may comprise a number of rigid structural elements 220 to support components such as wheels 230, manual or automatic drive mechanisms, or seat 240, as well as the weight of an occupant. These structural elements may be suitable for attaching a rear quick-disconnect coupler 120, but their construction and arrangement may vary and may not provide a desirable seat angle or a safe degree of ground clearance. A rigid attachment bar 130 may be affixed to, or formed as an integral component of, a wheelchair's frame assembly and formed in such a way as to raise the front of the wheelchair during towing to provide a suitable seat angle and level of front ground clearance. This provides additional adjustment options by enabling a user to affix various docking cradles 121, 121*a-b* of a rear coupler 120 to a variety of locations on a wheelchair including (but not limited to) wheel axles, structural cross-members, or attachment bars.

Figure 6:
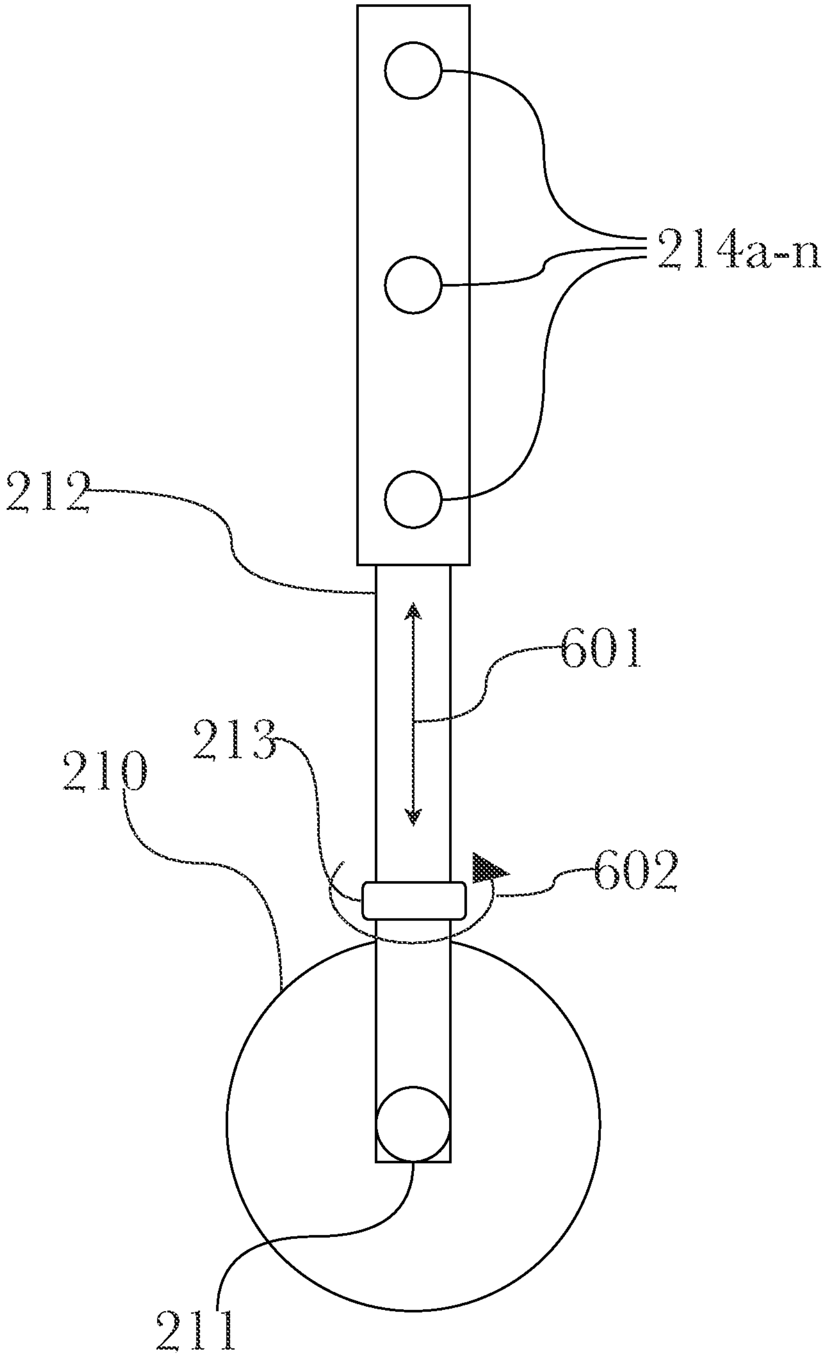
FIG. 6 is a diagram illustrating an exemplary wheelchair front wheel and its range of adjustment and movement, according to one aspect.

FIG. 6 is a diagram illustrating an exemplary wheelchair front wheel 210 and its range of adjustment and movement, according to one aspect. As illustrated, a front wheel 210 may be attached to a wheelchair 200 (not shown) via an axle 211 that is formed as a component of, or affixed to, a rigid structural element 212. Wheel 210 may rotate about its axle to facilitate rolling across a ground surface, and rigid structural element 212 may comprise a rotating collar or other form of pivot or joint 213 that allows the axle 211 to rotate about a second axis of motion 602, so that front wheel 210 can accommodate turns, inclines, and other changes in terrain or direction of movement. Rigid structural element 212 may further be adjustable vertically 601 to accommodate differences in rider size or posture, uneven terrain, or to provide a desired degree of ground clearance during towing or other operations. The vertical adjustment 601 may be locked into place via a push-button mechanism formed into rigid structural element 212, allowing a number of selectable positions 214*a-n* to be utilized via a simple push-button locking device that prevents unintended changes in the adjustment of the front wheel height.

Figure 7:
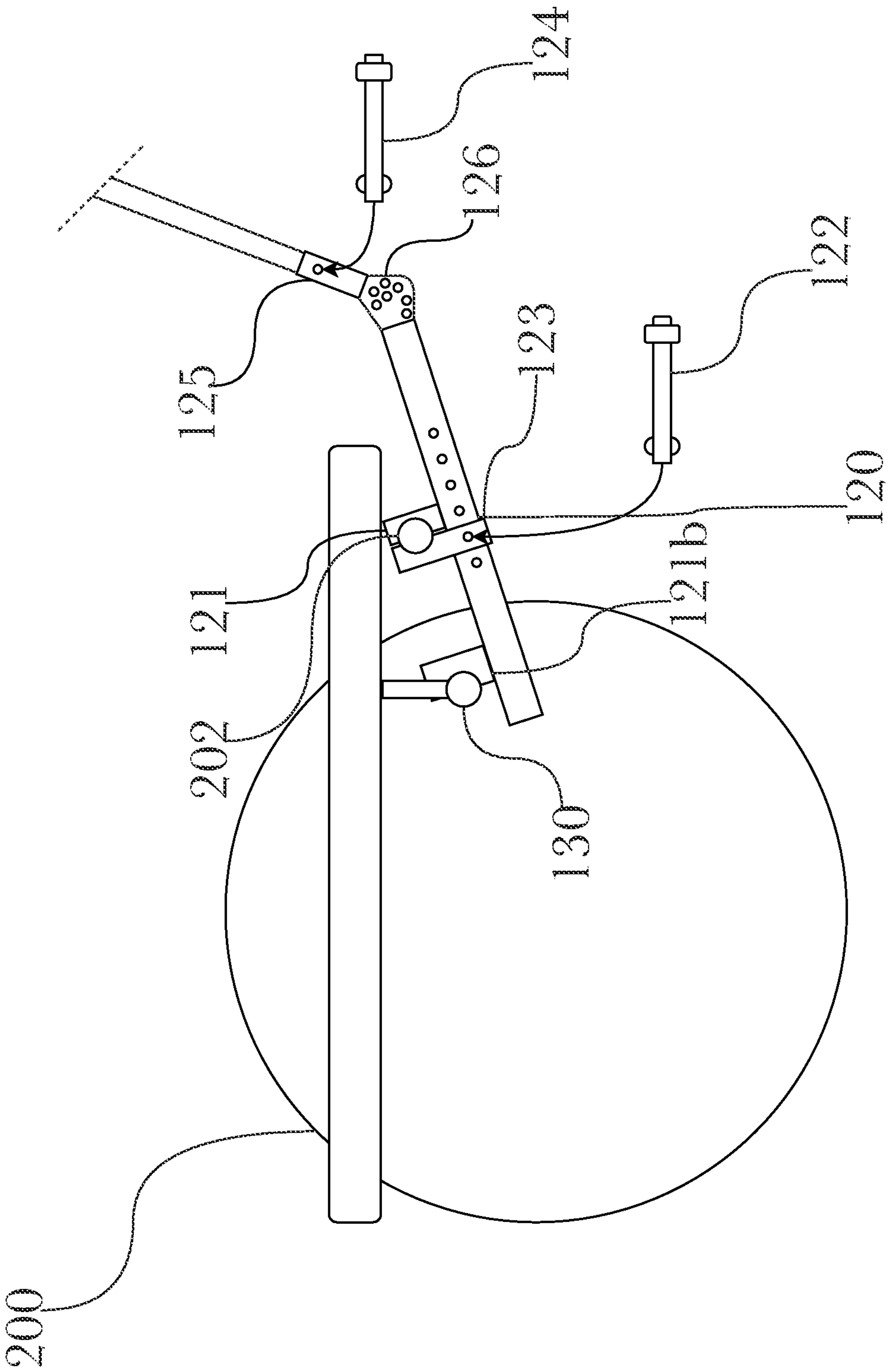
FIG. 7 is a diagram illustrating an exemplary detail view of a rear quick-disconnect coupler attachment showing the use of both a wheelchair structural element and an attachment bar, according to one aspect.

FIG. 7 is a diagram illustrating an exemplary detail view of a rear quick-disconnect coupler attachment 120 showing the use of both a wheelchair structural element 220 and an attachment bar 130, according to one aspect. As illustrated, a rear coupler 120 may be used to secure wheelchair 200 using a combination of rigid attachment points that may include both a structural element 290 of the wheelchair such as (for example, including but not limited to) a cross-bar, axle, or seat support, as well as a formed or attached rigid attachment bar 180 that is designed to interface with a docking cradle 121*b* for securing and adjusting wheelchair 200.

The skilled person will be aware of a range of possible modifications of the various aspects described above. Accordingly, the present invention is defined by the claims and their equivalents.

What is claimed is:

1. A wheelchair towing coupler for four-wheeled wheelchairs, comprising:

a rigid structural member constructed of a material that provides sufficient rigidity and strength to withstand stresses of towing a four-wheeled wheelchair having two front wheels and two rear wheels behind a vehicle, the rigid structural member comprising:

a first end having a cross-section and a straight length along a longitudinal axis perpendicular to the cross section, and having two rigid stops about the tubular cross-section, the two rigid stops being separated from one another by a distance along the longitudinal axis, the first end being configured for insertion into a first cradle of a front docking cradle between the two rigid stops;

a second end having a docking insert for insertion into a sliding adjuster of a rear docking cradle; and an angle adjustment joint located along the rigid structural member between the first end and the second end at a location, the angle adjustment joint allowing for adjustment of a first angle of the rigid structural member relative to the four-wheeled wheelchair and locking of the first angle after adjustment;

the front docking cradle configured to receive the first end of the rigid structural member and secure it within the first cradle while permitting rotation of the rigid structural member about the longitudinal axis, the front docking cradle comprising:

a means for attachment to a vehicle; and the first cradle having a length equal to or shorter than the distance between the two rigid stops, the first cradle having a concave, semi-circular receiving portion along its length and being configured to accept the first end of the rigid structural member along its straight length at a point between the two rigid stops; and a first quick-disconnect fastener configured to secure the first end of the rigid structural member within the first cradle until disconnected while permitting rotation of the first end of the rigid structural member about the longitudinal axis; and a rear docking cradle configured to affix a structural member of the wheelchair to the rigid structural member for towing, the rear docking cradle comprising:

a second cradle configured to accept a structural member of the wheelchair and hold the rear docking cradle in a fixed position relative to the structural member of the wheelchair;

a sliding adjuster configured to receive the docking insert of the second end of the rigid structural member and hold the second end of the rigid structural member in a fixed position relative to the second cradle such that, when the angle adjustment joint is locked at the first angle, placement of the first end of the rigid structural member into the first cradle of the front docking cradle causes the wheelchair to be tilted back onto the wheelchair's two rear wheels at a second angle sufficient to lift the wheelchair's two front wheels off the ground; and a second quick-disconnect fastener configured to secure the second end of the rigid structural member at a fixed location within the sliding adjuster until disconnected.

2. The wheelchair towing coupler of claim 1, wherein the first quick-disconnect fastener is a pin inserted through holes in an upper portion of the first cradle.

3. The wheelchair towing coupler of claim 1, wherein the angle adjustment joint is a pivoting joint having a push-button mechanism to adjust the first angle.

4. The wheelchair towing coupler of claim 1, wherein the attachment to a vehicle is an attachment to a seat tube of a bicycle.

* * * * *